US009855911B2

(12) United States Patent
Konaka et al.

(10) Patent No.: US 9,855,911 B2
(45) Date of Patent: Jan. 2, 2018

(54) HEAD-PROTECTING AIRBAG DEVICE

(71) Applicant: TOYODA GOSEI CO., LTD., Kiyosu-shi, Aichi-ken (JP)

(72) Inventors: Hirotake Konaka, Inazawa (JP); Ryosuke Jinnai, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/458,535

(22) Filed: Mar. 14, 2017

(65) Prior Publication Data
US 2017/0341616 A1    Nov. 30, 2017

(30) Foreign Application Priority Data

May 31, 2016 (JP) .................................. 2016-109298

(51) Int. Cl.
| B60R 21/16 | (2006.01) |
| B60R 21/213 | (2011.01) |
| B60R 21/215 | (2011.01) |
| B60R 21/231 | (2011.01) |
| B60R 21/237 | (2006.01) |

(52) U.S. Cl.
CPC .......... B60R 21/213 (2013.01); B60R 21/215 (2013.01); B60R 21/237 (2013.01); B60R 21/23138 (2013.01)

(58) Field of Classification Search
CPC ..... B60R 21/217; B60R 21/20; B60R 21/213; B60R 21/232
USPC ................................ 280/728.2, 728.3, 730.2
See application file for complete search history.

(56) References Cited

U.S. PATENT DOCUMENTS

| 6,375,214 | B1 * | 4/2002 | Nishikaji | ............... B60R 21/232 280/728.2 |
| 2002/0017775 | A1 * | 2/2002 | Tanase | .................. B60R 21/213 280/730.2 |
| 2003/0184057 | A1 * | 10/2003 | Kumagai | .............. B60R 21/201 280/728.3 |
| 2005/0029780 | A1 * | 2/2005 | Tanase | ................ B60R 13/0225 280/730.2 |
| 2009/0091105 | A1 * | 4/2009 | Okimoto | ............... B60R 21/213 280/728.3 |
| 2014/0265268 | A1 * | 9/2014 | Wang | .................... B60R 21/232 280/729 |

(Continued)

FOREIGN PATENT DOCUMENTS

JP          2011-031640 A       2/2011

*Primary Examiner* — Toan To
(74) *Attorney, Agent, or Firm* — Posz Law Group, PLC

(57) ABSTRACT

A head-protecting airbag device includes an airbag and a plurality of casings, each of which stores a folding completion body of the airbag, wherein: each of the casings has an opening for protruding the airbag; the casings are connected to each other by bendable coupling pieces; the folding completion body is configured to be carried in a state of being stored in one casing of the casings by bending of the coupling pieces; the coupling piece has a curved portion that is disposed in a curved manner by reversing between a base portion and a tip portion; and the curved portion is formed such that a protruding direction from a reference line connecting the base portion and the tip portion of the coupling piece is set in a direction intersecting with a surface along an overlapping direction of a longitudinal direction of the one casing with openings.

4 Claims, 15 Drawing Sheets

(56) References Cited

U.S. PATENT DOCUMENTS

2015/0191141 A1* 7/2015 Wang .................... B60R 21/232
                                                    280/730.2
2015/0239415 A1* 8/2015 Tsujimoto ............. B60R 21/217
                                                    280/728.2
2015/0367801 A1* 12/2015 Fukuda ................... B65B 53/02
                                                    280/728.2

* cited by examiner

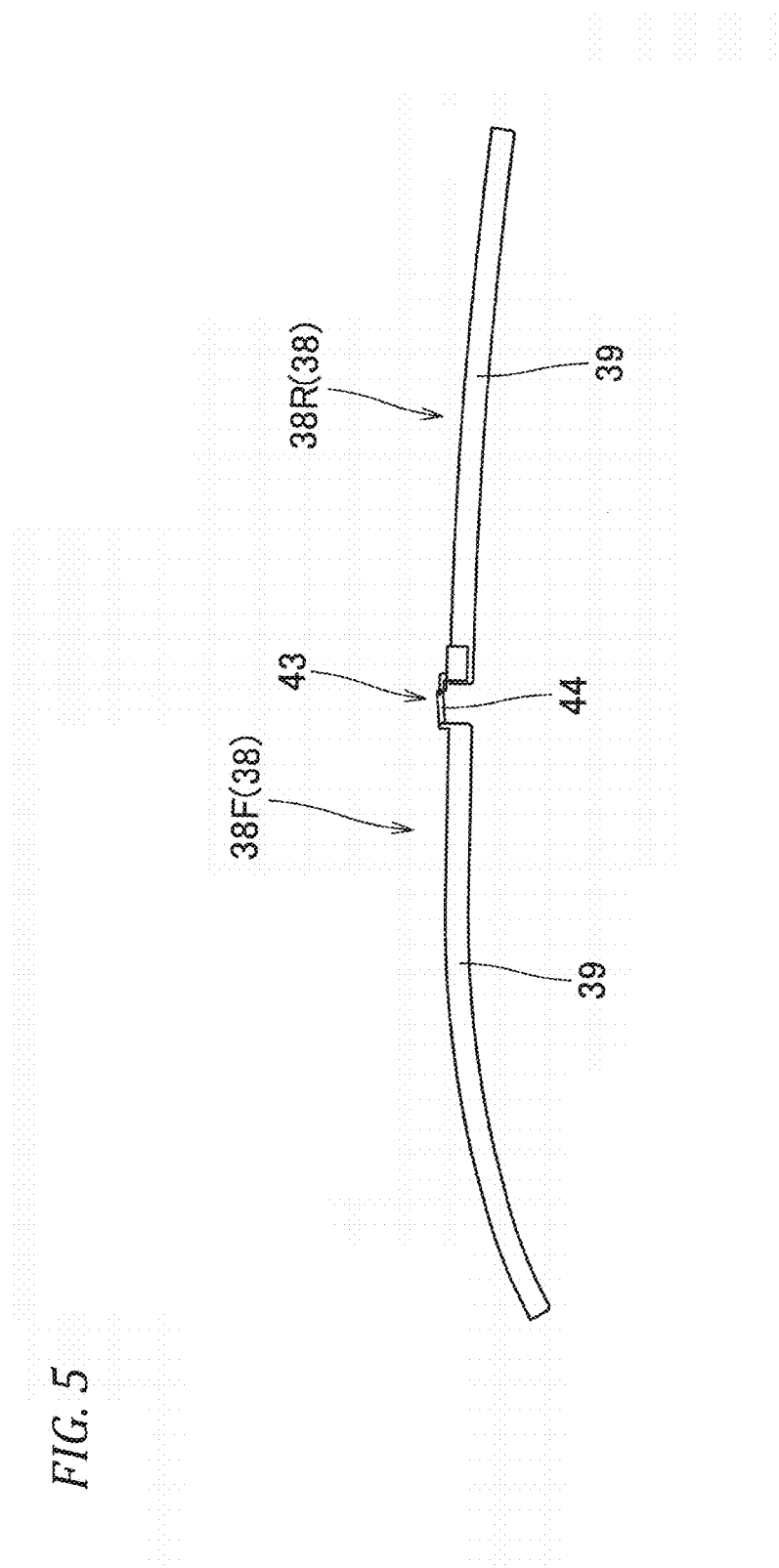

HEAD-PROTECTING AIRBAG DEVICE

CROSS-REFERENCE TO RELATED APPLICATION(S)

This application is based upon and claims the benefit of priority from Japanese Patent Application No. 2016-109298, filed on May 31, 2016, the entire contents of which are incorporated herein by reference.

BACKGROUND

1. Field of the Invention

The present invention relates to a head-protecting airbag device configured to have an airbag that is configured to cover a window of a vehicle when the airbag is deployed and inflated and is stored in an upper edge of the window on a vehicle interior side, and a synthetic-resin casing that stores a folding completion body of the airbag folded to be brought close to a lower edge when the airbag is deployed and inflated.

2. Description of the Related Art

In the related art, a head-protecting airbag device is configured such that a plurality of casings storing a folding completion body are arranged in a longitudinal direction of the folding completion body, and are connected to each other by bendable coupling pieces. The coupling piece is configured to have a curved portion that is bent and disposed to allow the folding completion body to be bendable in the state of an airbag assembly stored in the casing. In the conventional head-protecting airbag device, the curved portion is disposed to protrude upwards from a roof wall portion of the casing that covers a top of the folding completion body, in a state where the casing storing the folding completion body is mounted in a vehicle (for example, see JP-A-2011-31640).

That is, in the conventional head-protecting airbag device, the curved portions are disposed along a surface in an overlapping direction of the longitudinal direction of the casings with protruding openings, in the state where the folding completion body is bent to cause the protruding openings formed in lower portions of the casings to face each other when the casings are mounted in the vehicle. In other words, since the curved portion is disposed to pass through an outermost peripheral side in a region where the folding completion body is bent, a proper length is required to allow the folding completion body to be smoothly bent. However, the conventional head-protecting airbag device is problematic in that a long length of the curved portion causes an upwardly protruding amount of the curved portion to be increased, so that it is impossible to ensure a space for arranging the curved portion, for example, when a space of an upper edge of a window for storing the folding completion body is small and a vehicle component is placed close thereto.

SUMMARY

The present invention has been made to solve the above-described problems, and an object thereof is to provide a head-protecting airbag device, which prevents a coupling piece for connecting casings to each other from interfering with surrounding vehicle components, thus allowing the device to be smoothly mounted in a vehicle.

According to an aspect of the present invention, there is provided a head-protecting airbag device including: an airbag configured to cover a window of a vehicle when the airbag is deployed and inflated, the airbag being stored in an upper edge of the window on a vehicle interior side; and a plurality of casings, each of which is made by synthetic-resin, and stores a folding completion body of the airbag formed by folding a lower edge to be brought close to an upper edge when the airbag is deployed and inflated, wherein: each of the casings has a protruding opening for protruding the airbag at least in a lower portion thereof when the casings are mounted in the vehicle; the casings are arranged in a longitudinal direction of the folding completion body, and are connected to each other by bendable coupling pieces; the folding completion body is configured to be carried in a state of being stored in one casing of the casings by bending of the coupling pieces, before being mounted in the vehicle; the coupling piece has a curved portion that is disposed in a curved manner by reversing between a base portion of one casing side and a tip portion of another casing side; and the curved portion is formed such that a protruding direction from a reference line connecting the base portion and the tip portion of the coupling piece is set in a direction intersecting with a surface along an overlapping direction of a longitudinal direction of the one casing with protruding openings, in the state where the folding completion body is bent to cause the protruding openings of two casings connected to each other by the coupling pieces to face each other.

In the head-protecting airbag device of the present invention, the curved portion of the coupling piece for connecting the casings to each other is configured such that a protruding direction from a reference line connecting the base portion and the tip portion of coupling piece is set in a direction intersecting with a surface along an overlapping direction of a longitudinal direction of the casing with protruding openings, in the state where the folding completion body is bent to cause the protruding openings of the casings to face each other. That is, the head-protecting airbag device of the present invention is configured such that, when the folding completion body is folded and bent to cause the protruding openings of the casings to come near to each other, the curved portion is disposed to pass through a location distant from an outermost peripheral side, in a region where the folding completion body is folded and bent. Therefore, this is different from the related art where the curved portion is disposed such that the protruding direction from the reference line is disposed along a surface following the overlapping direction of the longitudinal direction of the casing with the protruding openings. The head-protecting airbag device of the present invention prevents the curved portion from protruding upwards from the casing while suppressing an upward protruding amount of the curved portion, in the state where the casing storing the folding completion body therein is mounted in the vehicle. Therefore, even in the casing where the vehicle component is disposed close to a storage portion at an upper position and it is difficult to ensure a storage space that is wide in a vertical direction, it is possible to smoothly store the folding completion body, which has been stored in the casing, in the storage space at the upper position of the window.

Accordingly, even if the head-protecting airbag device of the present invention is equipped with the coupling piece for connecting the casings to each other, the head-protecting airbag device prevents the coupling piece from interfering with surrounding vehicle component, so that it is possible to smoothly mount the device on the vehicle.

To be more specific, in the head-protecting airbag device of the present invention, if the curved portion is formed such that the protruding direction of the curved portion from the reference line connecting the base portion and the tip portion of the coupling piece, in the state where the device is mounted in the vehicle, is a direction protruding towards the vehicle interior side in an upper side of the folding completion body, preferably, it is possible to dispose the curved portion in the region of the vehicle interior side of the casing having a relatively large storage space, and it is possible to more precisely prevent the folding completion body stored in the casing from interfering with the surrounding vehicle component.

Further, in the head-protecting airbag device of the present invention, if the curved portion is formed in the shape of a column having an almost equal isolation distance from an axial center to an outer surface thereof, a section modulus of the curved portion is kept the same even if it is bent in any direction, and it is possible to guarantee easy and equal bending. Thus, although a casing overlapping direction varies when the folding completion body is folded and bent, preferably, it is easy to bend the curved portion, and it is possible to smoothly fold and bend the folding completion body.

Moreover, in the head-protecting airbag device configured as such, if the curved portion is formed to have an approximately circular cross-section, preferably, it is possible to keep the section modulus constant and more easily bend the curved portion.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 5 is a front view of a casing used in the head-protecting airbag device according to the embodiment;

DETAILED DESCRIPTION OF THE INVENTION

Figure 1:
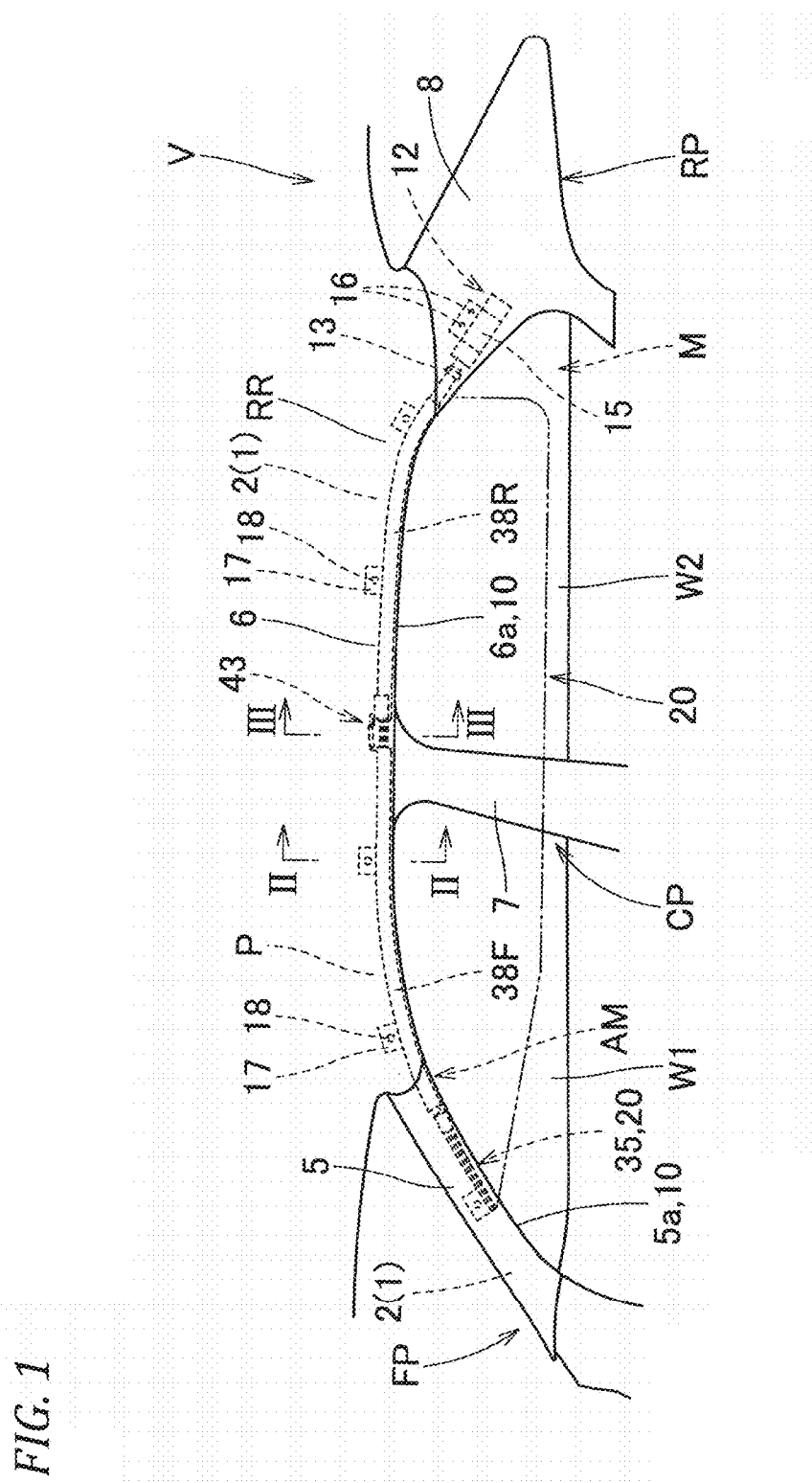
FIG. 1 is a schematic front view illustrating a head-protecting airbag device of an embodiment of the invention when viewed from a vehicle interior side.

Hereinafter, one embodiment of the invention will be described on the basis of the drawings. As illustrated in FIG. 1, in the head-protecting airbag device M of the embodiment, the airbag 20 is stored in a folded state in the peripheral edge on the upper edge side of windows (side window) W1 and W2, that is, in a storage portion P which is an area from a front pillar FP through a roof side rail RR to the upper vicinity of a rear pillar RP, and can cover the windows W1 and W2 of a vehicle V when inflated completely. In the embodiment, the vehicle V is configured in which one central pillar CP is disposed along an approximately vertical direction between the front pillar FP and the rear pillar RP. As illustrated by a two-dot chain line in FIG. 1, at the time of completion of inflation, the airbag 20 is configured to cover the windows W1 and W2 and a part of the vehicle interior side of a central pillar garnish 7 disposed in the central pillar CP or a rear pillar garnish 8 disposed in the rear pillar RP.

As illustrated in FIG. 1, the head-protecting airbag device M includes an airbag 20, an inflator 12 for supplying an inflation gas to the airbag 20, attachment brackets 15 and 17, attachment bolts 16 and 18, and casings 38F and 38R for storing a folding completion body 35 formed the airbag 20 in a folded state. When being mounted vehicleV on the vehicle V in state of including the attachment brackets 15 and 17, the folded airbag 20 (folding completion body 35), the inflator 12, and the casing 38F and 38R are stored in the storage portion P in such a manner that an vehicle interior side I is covered with an airbag cover 10 (see FIGS. 2 and 3). In the embodiment, the airbag cover 10 is configured to include a lower edge 5a of the front pillar garnish 5 that covers the vehicle interior side of the front pillar FP and a lower edge 6a of a roof head lining 6 that covers the inboar side of the roof side rail RR.

Together with the central pillar garnish 7 and the rear pillar garnish 8, the front pillar garnish 5 and the roof head lining 6 are mounted to the vehicle interior side I of an inner panel 2, which is a member of the body 1 in the front pillar FP or the roof side rail RR, by an attachment unit (not illustrated) made of a synthetic resin. The airbag cover 10 contituted by the lower edges 5a and 6a of the front pillar garnish 5 and the roof head lining 6 is pressed by the airbag 20 such that the airbag 20 can protrude at the time of deployment and inflation and thus the lower edges 5a and 6a can be openable to the vehicle interior side I (see a two-dot chain line illustrated in FIG. 2).

The inflator 12 supplies an inflation gas to the airbag 20. As illustrated in FIG. 1, the inflator is a substantially cylindrical type, and a gas discharge port (not illustrated) which can discharge the inflation gas is disposed on the tip portion side of the inflator. The tip portion of the inflator 12 including the vicinity of the gas discharge port is inserted into a connection port 23a (to be described later) of the airbag 20, and the inflator 12 is connected with the airbag 20 using a clamp 13 disposed on the outer peripheral side of the connection port 23a. The inflator 12 is mounted in a region of the rear pillar RP in the inner panel 2 using the attachment bracket 15 for holding the inflator 12 and the bolt 16 for fixing the attachment bracket 15 to the inner panel 2 on the body 1 (see FIG. 1).

Figure 2:
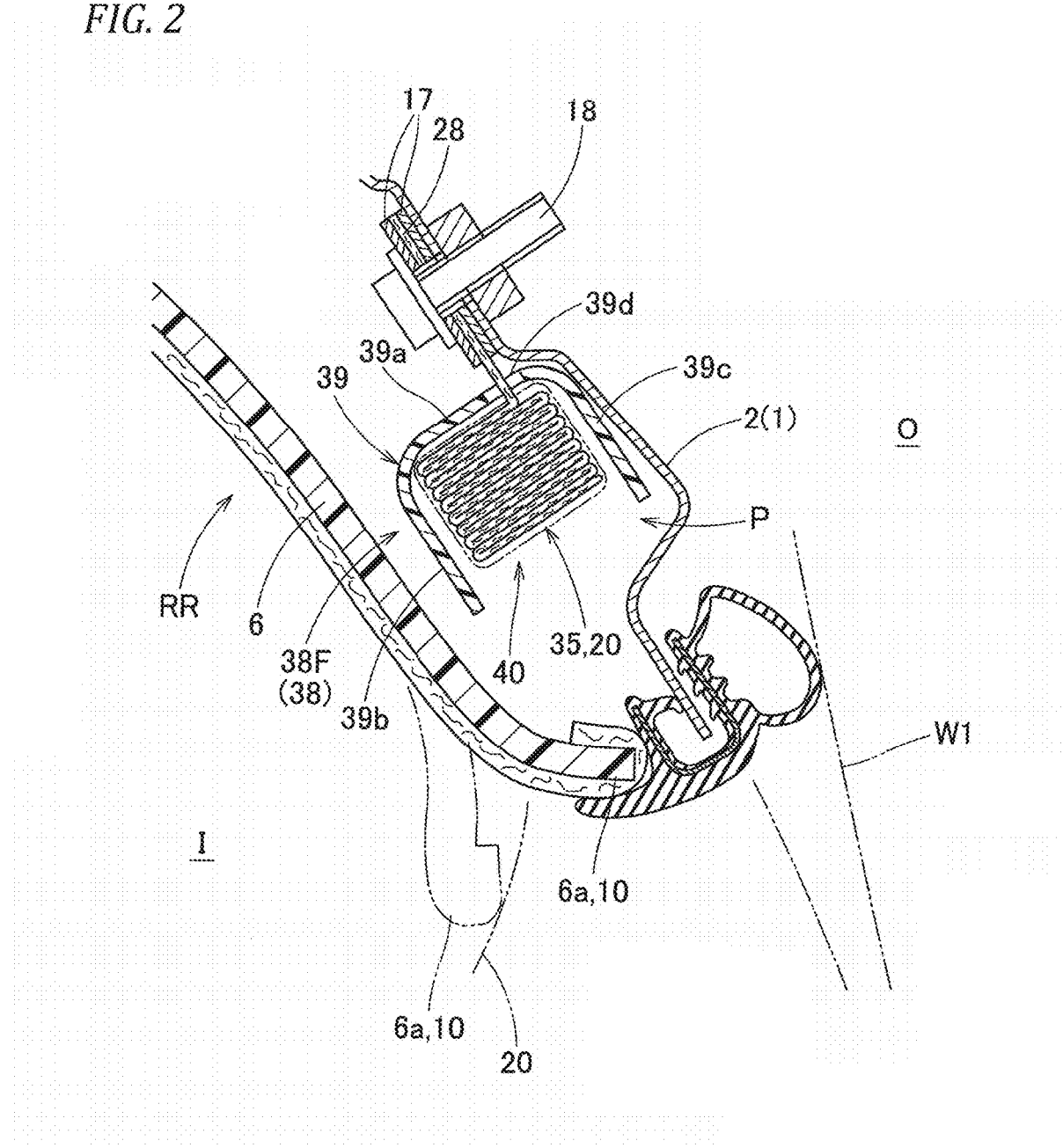
FIG. 2 is a vertical cross-sectional view taken along line II-II in FIG. 1 and illustrates the head-protecting airbag device according to the embodiment in a state of being mounted in a vehicle.

The attachment bracket 17 is formed of a two-sheet metal plate, and is mounted into attachment portions 28 (to be described later) by nipping the attachment portions 28 of the airbag 20 from the front and back, as illustrated in FIG. 2. The attachment portions 28 are fixedly mounted in the inner panel 2 on the body 1 using the bolt 18 (see FIGS. 1 and 2).

Figures 4A, 4B:
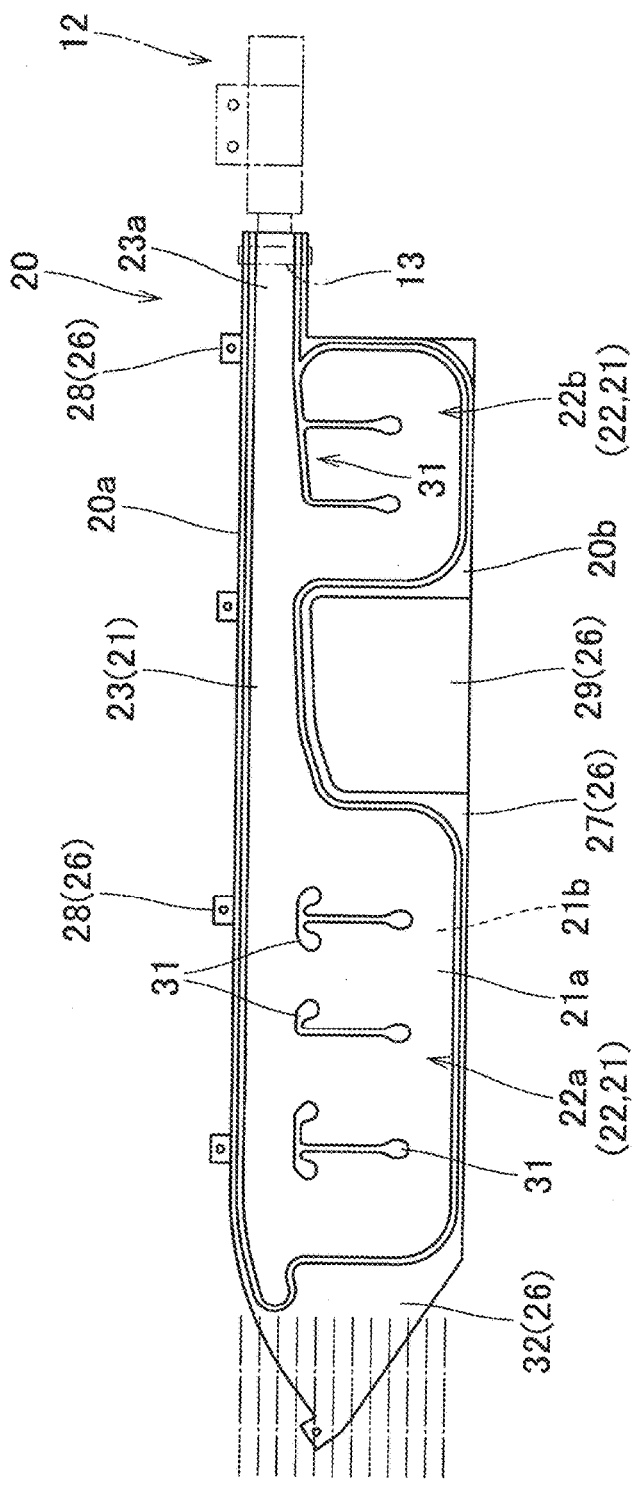
FIGS. 4A and 4B are diagrams illustrating a state where an airbag used in the head-protecting airbag device according to the embodiment is folded from a flatly deployed state.

As illustrated by a two-dot chain line in FIG. 1, the airbag 20 is configured to be deployed from the folded state when the inflation gas flows inside from the inflator 14, and to cover the windows W1 and W2 and the vehicle interior side of the central pillar garnish 7 and the rear pillar garnish 8 in a central pillar CP and the rear pillar RP. As illustrated in FIGS. 4A and 4B, the airbag 20 includes a gas inflow portion 21, which is inflated when the inflation gas flows such that an vehicle interior side wall 21a and an vehicle exterior side wall 21b are separated, and a non-inflow portion 30 which does not admit the inflation gas to flow such that the vehicle interior side wall 21a and the vehicle exterior side wall 21b are not coupled to each other. in the case of the embodiment, the gas inflow portion 21 includes a protective inflation portion 22 and a gas guidance path 23. The non-inflow portion 26 includes a peripheral edge 27, an attachment portion 28, plate-like portions 29 and 30, and a closing portion 31.

As illustrated in FIG. 4A, the protective inflation portion 22 of the gas inflow portion 21 includes a front-seat protecting portion 22a that covers the window W1 on the side of a front seat when the airbag 20 is completely inflated and a rear-seat protecting portion 22b that covers the window W2 on the side of a rear seat. The closing portion 31 is disposed inside the front-seat protecting portion 22a and the rear-seat protecting portion 22b to reduce the width dimension in the front-rear direction from a flatly deployed state when the airbag 20 is completely inflated and to maintain a plate shape extending in the front-rear direction while being regulated in thickness. The gas guidance path 23 guides the inflation gas to the protective inflation portion 22 and is disposed in the front-rear direction on an upper edge 20a of the airbag 20. On a rear end of the gas guidance path 23, the connection port 23a is formed to protrude from the rear end of the upper edge 20a of the airbag 20 and connected to the inflator 12. The connection port 23a has a rear end, and the rear end is opened into which the inflator 12 can be inserted.

In the non-inflow portion 26, the peripheral edge 27 is formed to surround an outer peripheral edge of the gas inflow portion 21 over the entire region excluding the rear end of the connection port 23a. The plate-like portion 29 is disposed between the front-seat protecting portion 22a and the rear-seat protecting portion 22b and has substantially a rectangular plate shape. The plate-like portion 30 has substantially a triangular shape and is disposed on the front end of the airbag 20.

The attachment portion 28 is disposed to protrude upward on the upper edge 20a of the airbag 20 including the plate-like portion 30, and is used to mount the upper edge 20a of the airbag 20 to the inner panel 2 on the body 1 of the vehicle V. As described above, each attachment portion 28 is mounted to the inner panel 1 on the body 1 using the attachment bracket 17 and the bolt 18.

Then, the airbag 20 is folded such that the lower edge 20b is brought close to the upper edge 20a, thereby forming the folding completion body 35 with a long shape along the front-rear direction in a state where the vehicle interior side wall 21a and the vehicle exterior side wall 21b are flatly deployed to be overlapped, and is then mounted in the vehicle V. In the embodiment, the airbag 20 is folded in a bellows manner such that a plurality of fold lines are provided in the front-rear direction and the lower edge 20b is brought close to the upper edge 20a Even in the folding completion body 35, as illustrated in FIG. 4B, the attachment portion 28 is disposed to protrude upward from an upper surface of the folding completion body 35.

In the case of the embodiment, as illustrated in FIGS. 1 and 5, a casing 38 storing the folded airbag 20 (folding completion body 35) includes two casings which are disposed in a longitudinal direction of the folding completion body 35, for example, the casing 38F storing a region of the front-seat protecting portion 22a and the casing 38R storing a region of the rear-seat protecting portion 22b. In the embodiment, each of the casings 38F and 38R is formed of polyolefin-based thermoplastic elastomer (TPO). As illustrated in FIG. 2, each casing 38 (38F or 38R) includes a cover portion 39 that covers the periphery of the folding completion body 35, and the casings are coupled to each other by a coupling piece 43.

As illustrated in Fig. the cover portion 39 is formed to have substantially a reverse U shape in cross section, thereby covering over the vehicle exterior side through the upper surface from the vehicle interior side I of the folding completion body 35, and a lower side thereof is opened. That is, each casing 38 includes a ceiling wall 39a that covers the upper surface of the folding completion body 35 and an vehicle exterior side wall 39c, and further includes a protruding opening 40, from which the airbag 20 protrudes, at a position being a lower side thereof when being mounted in the vehicle. In addition, an opening 39d is formed in a region of the cover portion 39 in which the attachment portion 28 is disposed, so that the attachment portion 28 mounted with the attachment bracket 17 can protrude (see FIG. 2)

Figure 10:
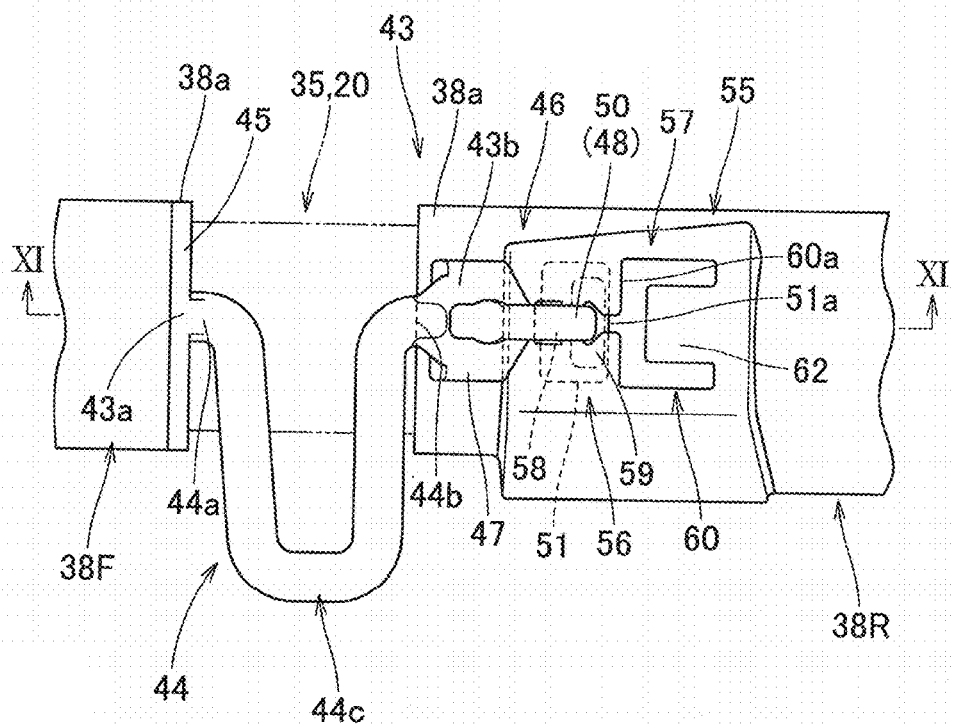
FIG. 10 is a partially enlarged plan view illustrating a state where the male engaging portion is engaged with the female engaging portion in the casing illustrated in FIG. 5.
Figure 11:
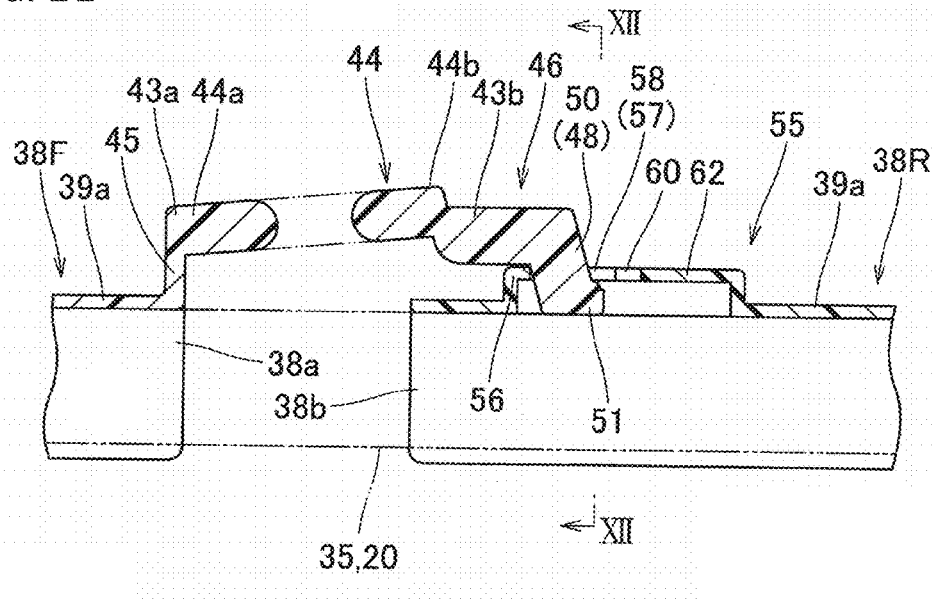
FIG. 11 is a cross-sectional view taken along line XI-XI in FIG. 10.

As illustrated in FIGS. 10 and 11, the coupling piece 43 coupling the casings 38F and 38R to each other includes a female engaging portion 55 disposed at a tip portion 44b of a curved portion 44 extending from the rear end 38a of the front casing 38F. With such a configuration, the casings 38F and 38R are coupled to each other when a male engaging portion 46 is engaged with the female engaging portion 55 disposed on a front end 38b of the rear casing 38R.

Figure 7:
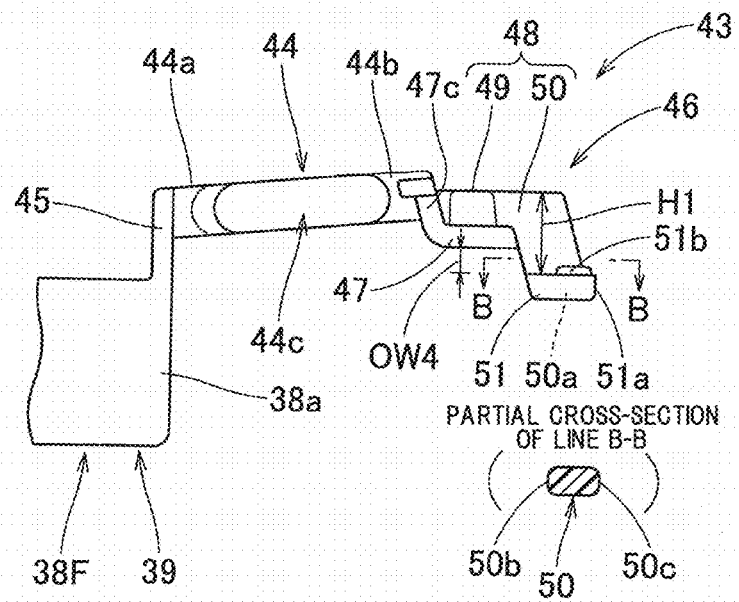
FIG. 7 is a front view of FIG. 6.

As illustrated in FIG. 7, in order to prevent the contact with the folding completion body 35 (airbag 20) stored in the casings 38F and 38R, the curved portion 44 is formed on the rear end 38a of the casing 38F to extend rearward from an attachment base portion 45 erected from the ceiling wall 39a of the cover portion 39, the curved portion 44 located above the ceiling wall 39a of the cover portion 39 is reversely disposed between a base portion 43a of the coupling piece 43 which is the rear end 38a of the casing 38F and a front end 43b of the coupling piece 43 which is the front end 38b of the casing 38R in a curved manner (in the embodiment, the male engaging portion 46 engaged with the female engaging portion 55 on the front end 38b of the casing 38R).

Figure 6:
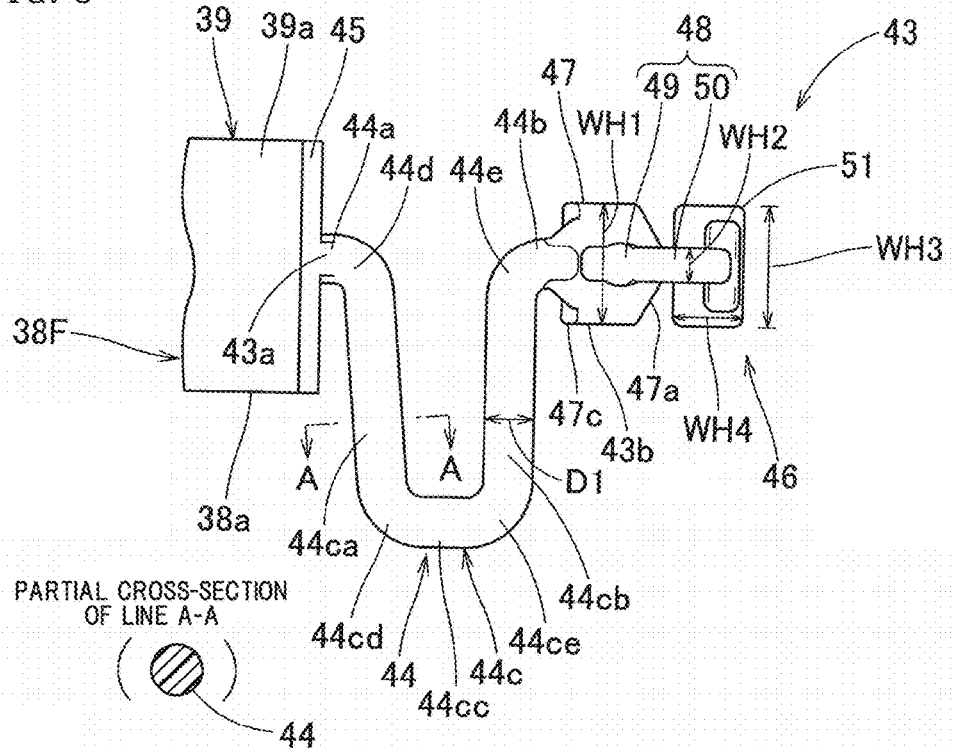
FIG. 6 is a partially enlarged plan view illustrating a curved portion and a male engaging portion of a coupling piece in the casing illustrated in FIG. 5.

Specifically, in the embodiment, the curved portion 44 is formed as a columnar shape having substantially a circular cross section and continuously extending as illustrated in FIG. 6. Thus, the curved portion 44 includes a reversion portion 44c that is reversely in a curved manner between the base portion 44a extending rearward from the ceiling wall 39a of the cover portion 39 in the casing 38F and the tip portion 44b disposed substantially along the front-rear direction on the male engaging portion 46 to protrude to the vehicle interior side I along substantially the ceiling wall 39a of the cover portion 39. As illustrated in FIG. 6, the reversion portion 44c includes a front horizontal rod 4ca and a rear horizontal rod 4cb that are arranged in the front-rear direction and formed substantially along a vehicle interior-exterior direction (left-right direction) and a coupling portion 44cc that is formed substantially along the front-rear direction to couple vehicle-exterior-side ends of the front horizontal rod 4ca and the rear horizontal rod 4cb to each other through bent portion 44cd and 44ce. That is, the reversion portion 44c has substantially an U shape which is substantially symmetrical in the front and rear. Vehicle-interior-side ends of the front horizontal rod 44ca and the rear horizontal rod 44cb in the reversion portion 44c are respectively coupled to the tip portion 44b and the base portion 44a that are disposed substantially in the front-rear direction, through the curved portions 44d and 44e. In the embodiment, that is, the curved portion 44 is formed such that a protruding direction from a reference line L (see FIG. 16) connecting the base portion 43a and the tip portion 43b of the coupling piece 43 in the state there the vehicle is mounted is defined as a direction protruding toward the vehicle interior side I on the upper side of the folding completion body 35 (see FIGS. 3 and 16).

The male engaging portion 46 disposed on the tip portion 44b of the curved portion 44 includes a pressing plate portion 47 formed substantially along the ceiling wall 39a of the cover portion 39 on the tip portion 44b (rear end) of the curved portion 44, a neck portion 48 extending toward (downward) the folded completion body 35 from the curved portion 44, and a head 51 disposed on a tip portion 50 of the neck portion 48. The head 51 protrudes toward both sides in the vehicle interior-exterior direction (left-right direction) perpendicular to an axial direction of the tip portion 50 in a lower end 50a of the tip portion 50 of the neck portion 48. In the embodiment, the neck portion 48 and the head protrude upward. In the embodiment, the neck portion 48 and the head 51 have substantially a T shape when viewed from above.

Figure 12:
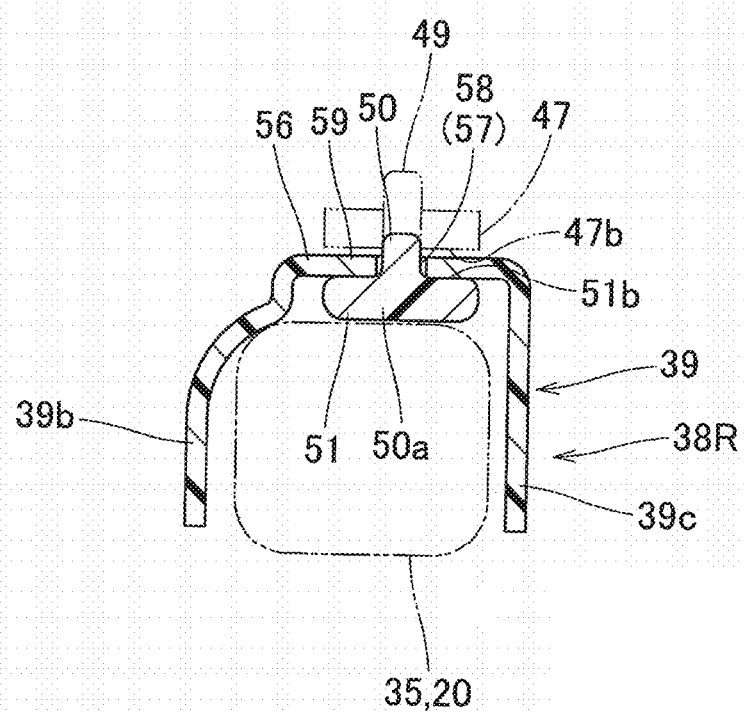
FIG. 12 is a cross-sectional view taken along line XII-XII in FIG. 11.

A pressing plate portion 47 includes a vertical wall portion 47c which connects the tip portion 44b of the curved portion 44 to the front end side thereof, and extends from the lower end of the vertical wall portion 47c to the rear side to be disposed in a position below the curved portion 44 (see FIG. 7). In the case of the embodiment, the pressing plate portion 47 is provided in a position above the ceiling wall 39a of the cover portion 39. As illustrated in FIG. 6, an outer shape thereof is configured as an approximately pentagonal shape in which the rear edge 47a which is on the tip portion 50 side of the neck portion 48 protrudes to the rear side in a laterally center. The pressing plate portion 47 is configured such that a width dimension WH1 in the left-right direction is larger than an outer diameter dimension D1 of the curved portion 44 (see FIG. 6). In addition, in a state where the male engaging portion 46 is engaged with the female engaging portion 55, the pressing plate portion 47 is provided on the upper surface side of an engaging hole formation portion 56 (to be described later) in the female engaging portion 55, to be close to the engaging hole formation portion 56 (see FIG. 12). When the male engaging portion 46 is engaged with the female engaging portion 55, or in a state where the male engaging portion 46 is engaged with the female engaging portion 55, the lower surface 47b abuts on the upper surface (a peripheral edge 59 of a narrow-width opening 58) of the engaging hole formation portion 56 so that it is suppressed that the male engaging portion 46 is dropped in the female engaging portion 55.

The neck portion 48 is formed to protrude to a lower rear side so as to extend from the tip portion 44b (rear end) of the curved portion 44 to the folding completion body 35. Specifically, the neck portion 48 includes a base portion 49 which is connected from the curved portion 44 to extend to the rear side on the upper surface side of the pressing plate portion 47, and the tip portion 50 which is formed to protrude from the pressing plate portion 47 to the lower rear side. As illustrated in FIG. 6, the neck portion 48 is set such that a width dimension WH2 in the vehicle interior-exterior direction (left-right direction) is smaller than the outer diameter dimension D1 of the curved portion 44. In addition, the tip portion 50 of the neck portion 48 is formed such that a height dimension H1 (see FIG. 7) is larger than the outer diameter dimension D1 of the curved portion 44, and is formed to protrude below the pressing plate portion 47. Further, the tip portion 50 of the neck portion 48 is configured to be capable of being fitted into the narrow-width opening 58 when the head 51 is engaged with the peripheral edge 59 of the narrow-width opening 58 (to be described later) of the engaging hole 57. The width dimension WH2 in the left-right direction is set to be slightly smaller than an opening width dimension OW1 (see FIG. 8) of the narrow-width opening 58. In addition, the width dimension of the tip portion 50 of the neck portion 48 in the front-rear-direction is set to such a dimension that the rear edge 51a of the head 51 is positioned slightly forward from a front edge 60a of a wide-width opening 60 in a state where a base portion side surface (front surface 50b) of the tip portion 50 abuts on a front edge 58a of the narrow-width opening 58 (see FIG. 10). A sectional shape of the tip portion 50 of the neck portion 48 is a substantially rectangular shape in which a longitudinal direction is substantially in the front-rear-direction (see FIG. 7).

The head 51 is formed to protrude from the tip portion 50 of the neck portion 48 to both sides in the vehicle interior-exterior direction (left-right direction) which is orthogonal to an axial direction of the tip portion 50. When described in detail, the head 51 is formed to protrude from a surface (lower end surface) of the tip portion 50 on the folding completion body 35 side to both right and left sides substantially along an opening surface (engaging hole formation portion 56) of the engaging hole 57. The outer shape of the head 51 is configured to be a substantially rectangular plate shape which is wide to right and left sides. A width dimension WH3 (a width dimension of the neck portion 48 in an axis orthogonal direction, see FIG. 6) in the left-right direction is set to be larger than the opening width dimension OW1 of the narrow-width opening 58, and to be smaller than an opening width dimension OW2 (see FIG. 8) of the wide-width opening 60 in the left-right direction, so as to be inserted only into the wide-width opening 60. In the case of the embodiment, the width dimension WH3 of the head 51 in the left-right direction is set to be almost the same as the width dimension WH1 of the pressing plate portion 47 in the left-right direction, and to be larger than the outer diameter dimension D1 of the curved portion 44. In addition, in the head 51, the width dimension WH3 in the left-right direction is set to be larger than a width dimension WH5 (see FIG. 8) of a pressing piece 62 (to be described later) formed in the female engaging portion 55 in the left-right direction. Further, in the head 51, a width dimension WH4 (see FIG. 6) in the front-rear-direction is set to be smaller than an opening width dimension OW3 (see FIG. 8) of the wide-width opening 60 in the front-rear-direction, and is set to be such a dimension that even in a state where the male engaging portion 46 is moved to the rear side so that a rear surface 50c of the tip portion 50 of the neck portion 48 abuts on a tip portion (front end 62a) of the pressing piece 62, a front end side portion 51c is positioned in a lower area of the peripheral edge 59 (engaging hole formation portion 56) of the narrow-width opening 58, and the front end side portion 51c abuts on the peripheral edge 59 of the narrow-width opening 58 to be engaged with the peripheral edge of the engaging hole 57.

As described above, a width dimension WH4 of the head 51 in the longitudinal direction is set to a dimension in which the rear edge 51a is disposed at a position slightly in front of the front edge 60a of the wide-width opening 60 when the front surface 50b of the front end 50 of the neck portion 48 is brought into contact with the front edge 58a of the narrow-width opening 58. In other words, the head 51 is formed so as not to protrude into an area of the wide-width opening 60 and not to overlap a pressing piece 62 which will be described later and is formed at the female engaging portion 55 in the vertical direction as illustrated in FIG. 10 when the front surface 50b of the front end 50 of the neck portion 48 is brought into contact with the front edge 58a of the narrow-width opening 58. Further, a width dimension OW4 of a clearance between the head 51 and the pressing plate portion 47 in the male engaging portion 46 is set to a dimension in which a peripheral edge 59 (a locking hole forming portion 56) of the narrow-width opening 58 can be inserted into the clearance (see FIG. 7).

Figure 8:
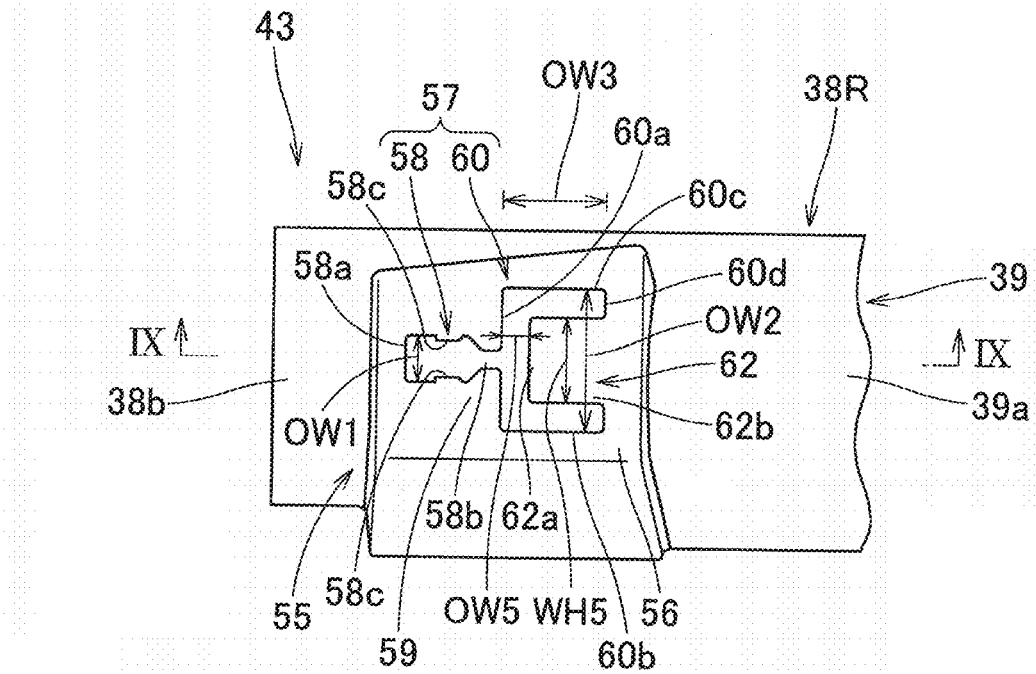
FIG. 8 is a partially enlarged plan view illustrating a female engaging portion of a coupling piece in the casing illustrated in FIG. 5.
Figure 9:
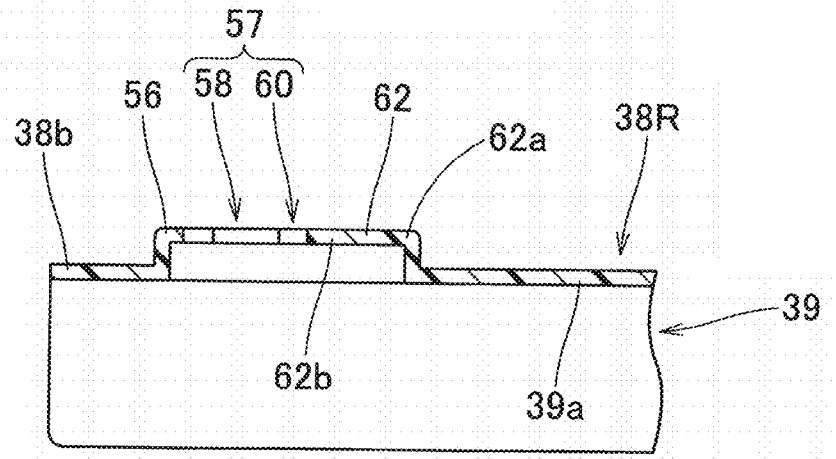
FIG. 9 is a cross-sectional view taken along line IX-IX in FIG. 8.

As illustrated in FIGS. 8 and 9, the female engaging portion 55 is formed at an area of the ceiling wall 39a on the front end side of the rear casing 38R. The female engaging portion 55 includes the locking hole forming portion 56 which is formed one step higher than the ceiling wall 39a to form a step shape with the ceiling wall 39a, the locking hole 57 which is formed at the locking hole forming portion 56, and the pressing piece 62 which is formed to block a part of the locking hole 57. Since the locking hole forming portion 56 is formed substantially parallel to the ceiling wall 39a while forming a step with the ceiling wall 39a, the lower surface of the head 51 of the male engaging portion 46 locked to the peripheral edge 59 of the narrow-width opening 58 of the locking hole 57 is disposed to be substantially flush with the lower surface of the ceiling wall 39a of the peripheral cover portion 39 (see FIG. 12).

The locking hole 57 is used to lock the head 51 by the peripheral edge during the engagement of the male engaging portion 46, includes the narrow-width opening 58 formed at the front side which is near the male engaging portion 46 and the wide-width opening 60 formed at the rear side distant from the male engaging portion 46, and is formed so that the narrow-width opening 58 and the wide-width opening 60 communicate with each other. In the case of the embodiment, the locking hole 57 is formed in a substantially convex shape when viewed from above (see FIG. 8). An opening width dimension OW1 of the narrow-width opening 58 is set so that only the front end 50 of the neck portion 48 of the male engaging portion 46 can be inserted into the narrow-width opening while the head 51 cannot be inserted thereinto. When the front end 50 of the neck portion 48 is inserted into the narrow-width opening so that an upper surface 51b of the head 51 is brought into contact with a lower surface 59a of the peripheral edge 59 of the narrow-width opening 58, the head 51 is locked by the peripheral edge 59 of the narrow-width opening 58. Opening width dimensions OW2 and OW3 of the wide-width opening 60 in the longitudinal and horizontal directions are respectively set so that the head 51 can be inserted into the wide-width opening. Then, in the embodiment, the front end 50 of the neck portion 48 is fitted into the narrow-width opening 58 when the head 51 is locked to the peripheral edge 59 of the narrow-width opening 58. Further, in the embodiment, as illustrated in FIG. 8, the vicinity of the boundary between the narrow-width opening 58 and the wide-width opening 60 is formed as a narrow portion 58b of which an opening width dimension is further reduced in order to restrict the backward movement of the front end 50. Further, in the embodiment, protrusions 58c and 58c which slightly protrude inward are formed at the intermediate longitudinal portions of the side edges facing each other in the horizontal direction of the narrow-width opening 58 in order to lock the outer peripheral surface of the front end 50 while the front end 50 of the neck portion 48 is fitted into the narrow-width opening 58 so that the front surface 50b is brought into contact with the front edge 58a.

As illustrated in FIG. 8, the pressing piece 62 is formed at the wide-width opening 60 to protrude from the rear edge 60d separated from the narrow-width opening 58 toward the narrow-width opening 58 and is disposed to substantially follow the opening surface of the locking hole 57. The pressing piece 62 is formed in a substantially rectangular plate shape to block the substantially whole area of the wide-width opening 60 and is formed to have a slight gap between the front edge 60a of the wide-width opening 60 and each of the side edges 60b and 60c facing each other in the horizontal direction. In other words, the pressing piece 62 is formed to extend forward from the locking hole forming portion 56 and is formed so that the front end (the front end 62a) near the narrow-width opening 58 can be bent about the rear end 62b near the locking hole forming portion 56 in the vertical direction orthogonal to the opening surface of the locking hole 57. Then, a clearance between the front end 62a of the pressing piece 62 and the edge (the front edge 60a) near the narrow-width opening 58 in the wide-width opening 60 is set so that an opening width dimension OW5 (see FIG. 8) in the longitudinal direction is smaller than a width dimension of the front end 50 of the neck portion 48 in the longitudinal direction. That is, the front end 50 of the neck portion 48 is formed so as not to be inserted into a clearance between the front end 62a of the pressing piece 62 and the front edge 60a of the wide-width opening 60. More specifically, even when the whole male engaging portion 46 moves backward to be away from the narrow-width opening 58, the front end 50 of the neck portion 48 comes into contact with the front end 62a of the pressing piece 62 so that the whole male engaging portion cannot enter an area of the wide-width opening 60 (see FIG. 15).

Figure 13:
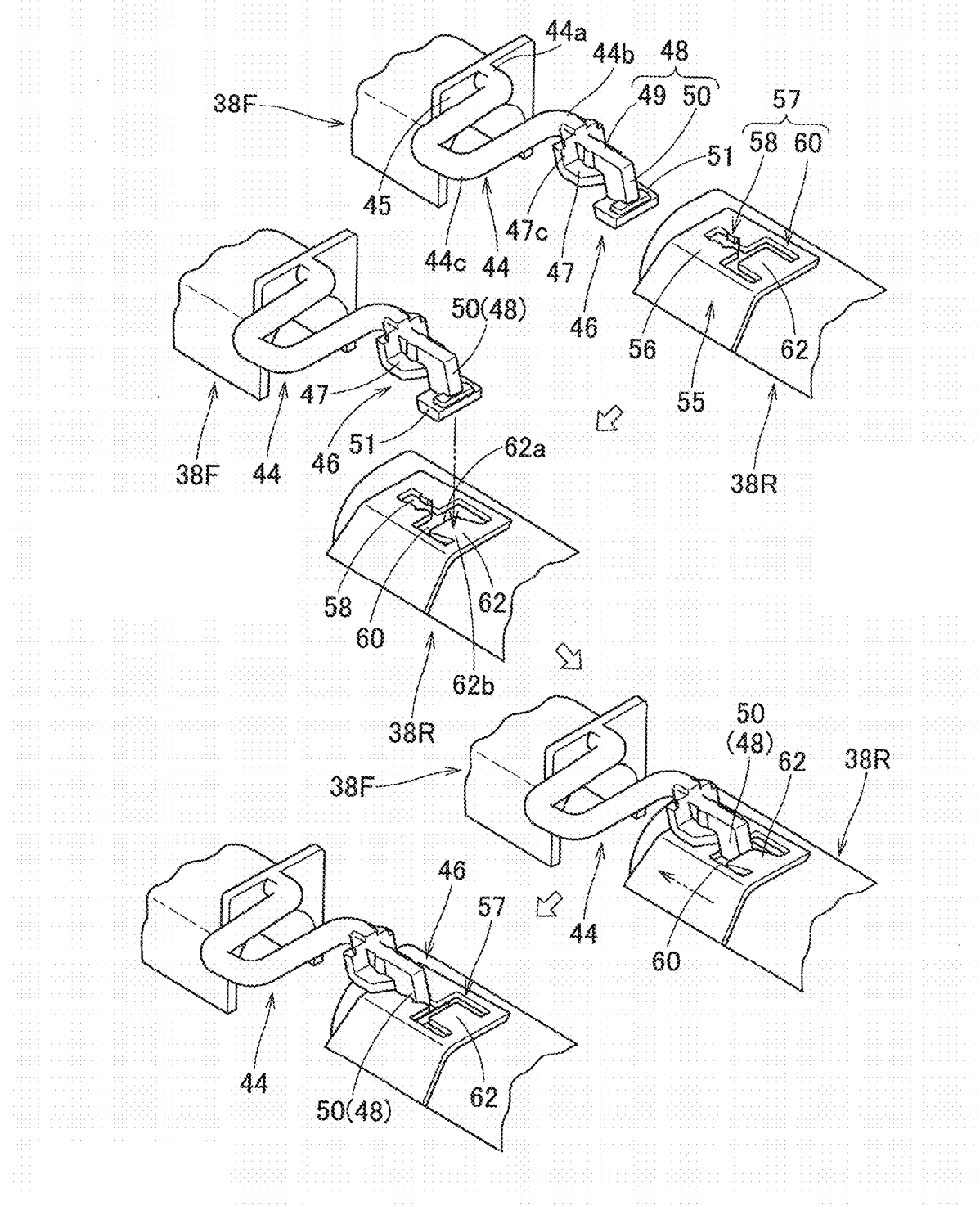
FIG. 13 is a partially enlarged perspective view schematically illustrating a state where the male engaging portion is engaged with the female engaging portion in the casing illustrated in FIG. 5.

Next, a case in which the head protecting airbag device M of the embodiment is mounted on the vehicle V will be described. First, as illustrated in FIGS. 4A and 4B, the airbag 20 excluding a portion of a connection port 23a is folded into a bellows shape so that the lower edge 20b approaches the upper edge 20a from a state where the airbag is flatly developed so that the vehicle interior side wall portion 21a and the vehicle exterior side wall portion 21b overlap each other, thereby obtaining an elongated folded body 35 in the longitudinal direction. Next, a breakable folding collapse preventing wrapping material 70 is partially wound around the folded body 35 (see FIG. 4B). Next, an attachment bracket 17 is attached to an attachment portion 28 protruding from the folded body 35 and an inflator 14 having an attachment bracket 15 is connected to the connection port 23a of the airbag 20 by using a clamp 13. Next, the folded body 35 is accommodated in the casings 38F and 38R, the male engaging portion 46 provided at the casing 38F is engaged with the female engaging portion 55 provided at the casing 38R, and the casings 38F and 38R are connected to each other by a coupling piece 43. Specifically, as illustrated in FIG. 13, when the head 51 of the male engaging portion 46 is pressed into the wide-width opening 60 while the pressing piece 62 provided in an area of the wide-width opening 60 of the female engaging portion 55 is bent and the whole male engaging portion 46 is moved toward the casing 38F so that the front end 50 of the neck portion 48 is pulled into the narrow-width opening 58, the head 51 is locked to the peripheral edge 59 of the narrow-width opening 58. Then, since the pressing piece 62 is restored at this time, the upper surface 51b is brought into contact with the lower surface 59a of the peripheral edge 59 of the narrow-width opening 58 while the returning of the head 51 toward the wide-width opening 60 is restricted by the restored pressing piece 62 so that the head 51 can be locked to the peripheral edge 59 of the narrow-width opening 58, thereby forming an airbag assembly AM (see FIG. 14).

Figure 14:
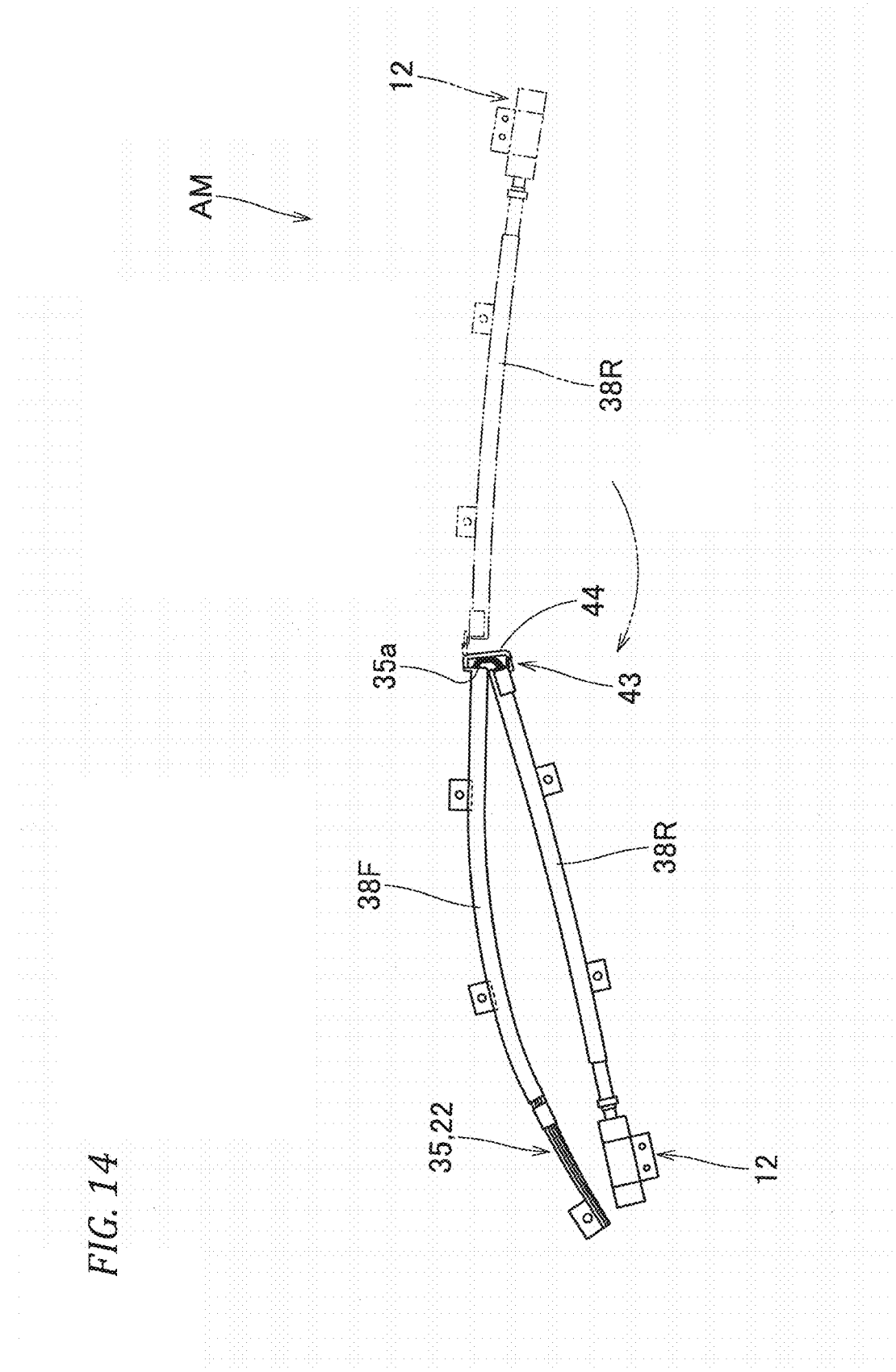
FIG. 14 is a diagram illustrating a state an airbag assembly is bent in the head-protecting airbag device according to the embodiment.
Figure 16:
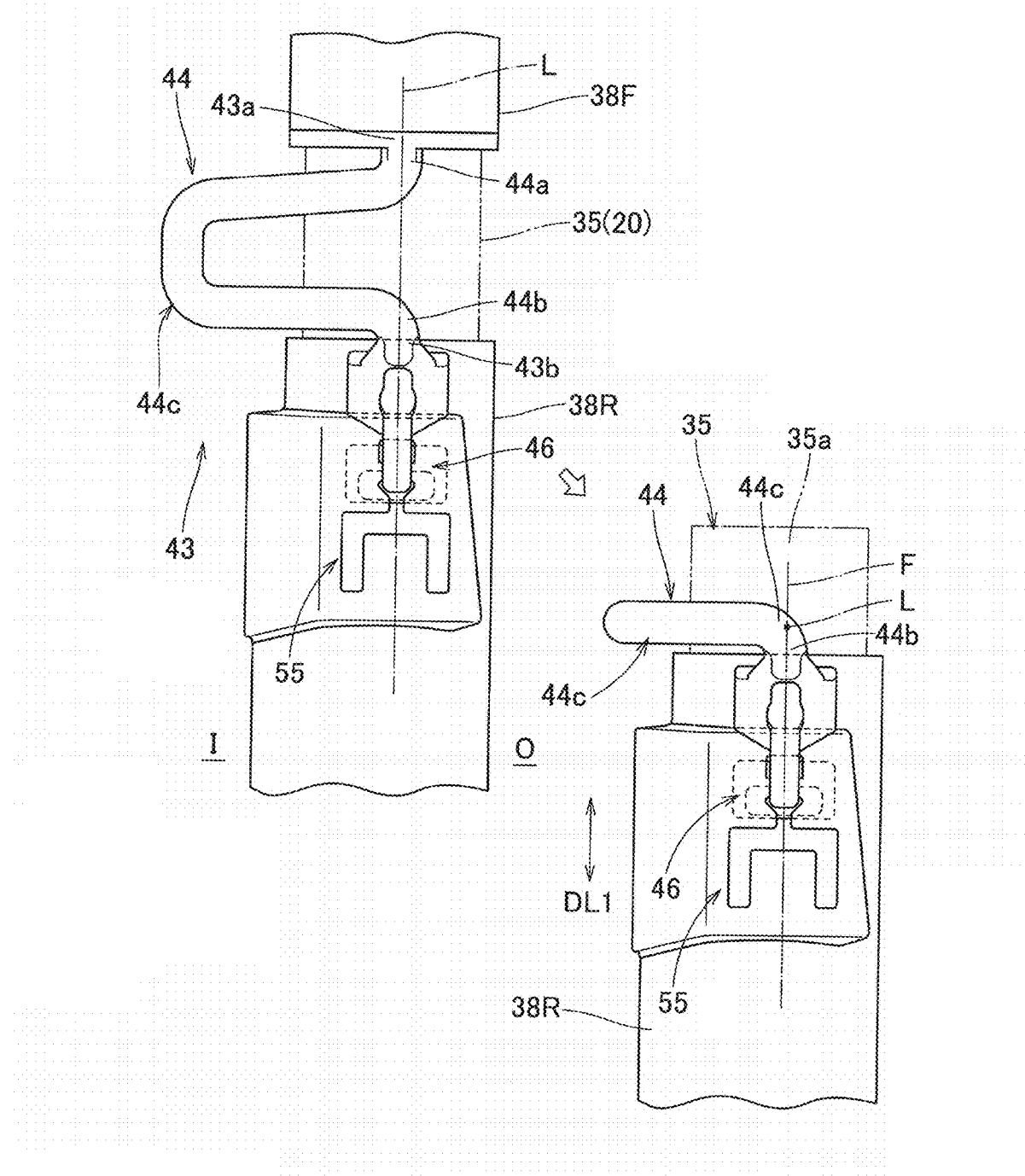
FIG. 16 is a partially enlarged side view schematically illustrating a state an airbag assembly is bent in the head-protecting airbag device according to the embodiment.
Figure 17:
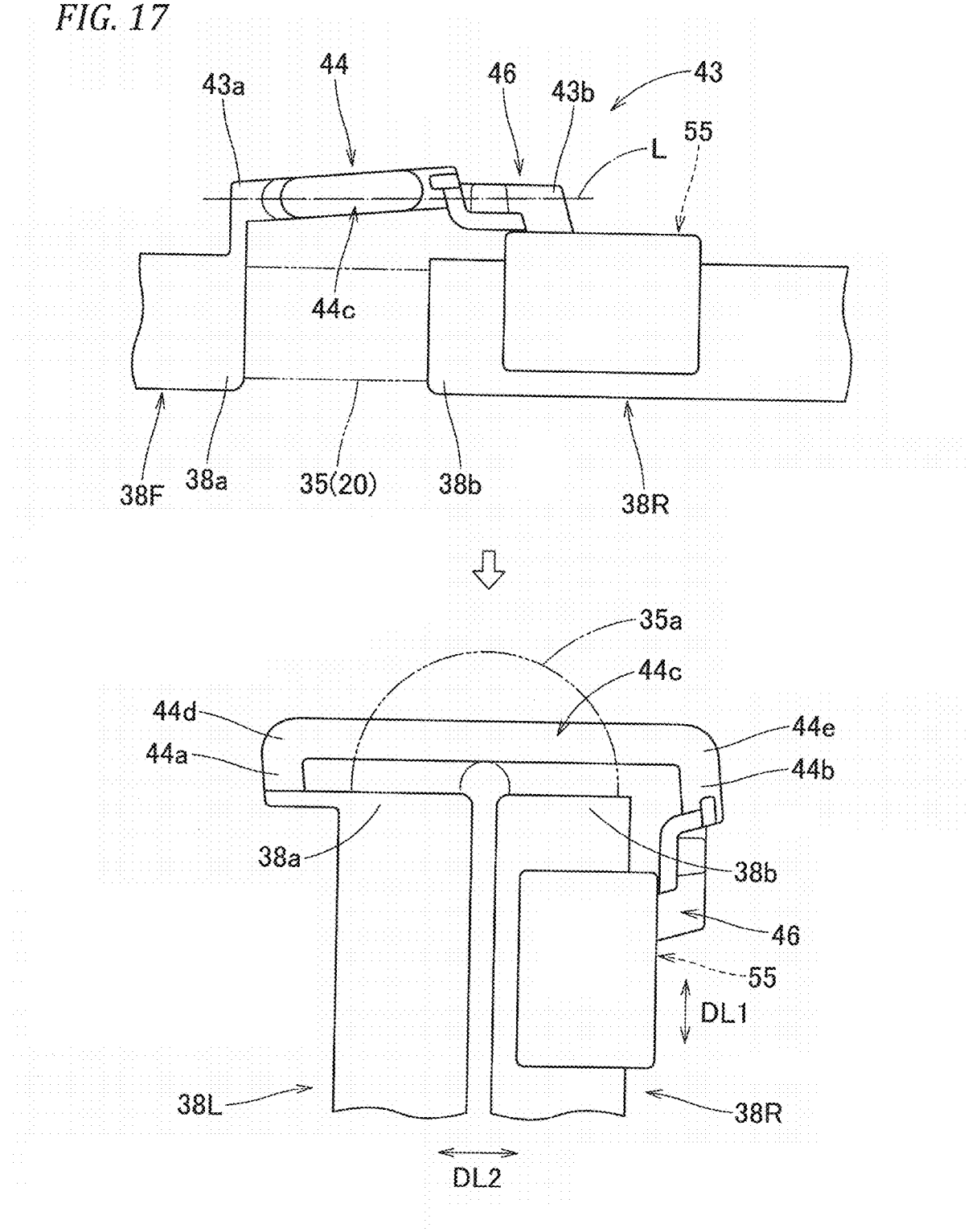
FIG. 17 is a partially enlarged front view schematically illustrating a state an airbag assembly is bent in the head-protecting airbag device according to the embodiment.
Figure 18:
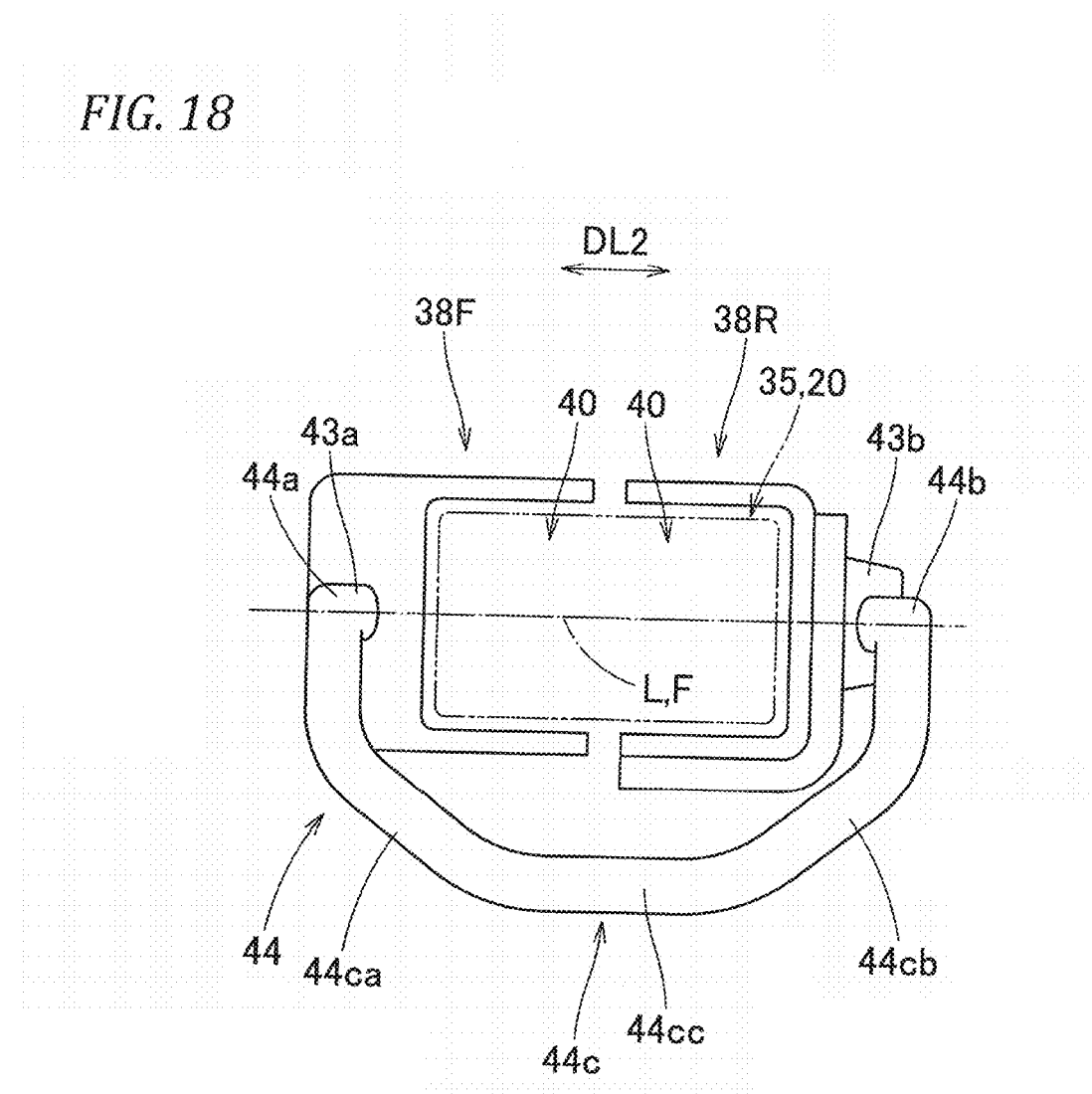
FIG. 18 is a partially enlarged plan view schematically illustrating a state an airbag assembly is bent in the head-protecting airbag device according to the embodiment.

In the embodiment, as depicted by the solid line and the two-dotted chain line in FIG. 14, when the airbag assembly AM is bent at the portion of the curved portion 44 of the coupling piece 43 between the casings 38F and 38R, the airbag assembly AM can be made compact. Specifically, in the case of the embodiment, the airbag assembly AM (the folded body 35) is folded between the casings 38F and 38R so that the protruding openings 40 and 40 of the casings 38F and 38R face each other, in other words, the folded bodies 35 are brought into contact with each other. At this time, in the embodiment, the curved portion 44 is disposed so that the protruding direction from a reference line L (see FIGS. 16 to 18) connecting a front end 43b of the coupling piece 43 to a base end 43a thereof intersects the length direction DL1 of the casings 38F and 38R (see FIGS. 16 and 17). In detail, as illustrated in FIGS. 16 and 17, in a state where the folded body 35 is folded so that the longitudinal direction D1 of the casings 38F and 38R is substantially aligned in the vertical direction, the curved portion 44 is disposed so as to be substantially orthogonal to the reference line L connecting the base portion 43a and the front end 43b arranged along the overlapping direction DL2 (see FIG. 17) of the protruding openings 40 and 40 and to substantially orthogonal to the length direction DL1 of the casings 38F and 38R. That is, the curved portion 44 is disposed so as to pass through a position separated from the outermost peripheral side in a folded area (a folded area 35a) of the folded body 35 as illustrated in FIGS. 16 and 17 when the folded body 35 is folded. More specifically, in the embodiment, as illustrated in FIGS. 16 and 17, the curved portion 44 is disposed so as to protrude from the base side area (on the side of the front end where the casings 38F and 38R face each other) of the folded area 35a while being twisted at a predetermined portion without passing through the folded area 35a of the folded body 35 so that the curved state of a reversed portion 44c extends (front and rear lateral knuckle portions 44ca and 44cb are connected to a coupling portion 44cc while vehicle exterior side ends are separated from each other) as specifically illustrated in FIG. 18.

At the time when the head protecting airbag device M is mounted on the vehicle V, the airbag assembly AM is restored from the folded state as depicted by the solid line and the two-dotted chain line illustrated in FIG. 14. Then, the attachment brackets 15 and 17 are disposed at predetermined positions of the inner panel 2 on the side of the body 1 and are fixed by bolts 16 and 18, a lead wire (not illustrated) extending from a predetermined inflator operation control device is connected to the inflator 12, a front pillar garnish 5 or a roof head lining 6 is attached to the inner panel 2 on the side of the body 1, and pillar garnishes 7 and 8 are attached to the inner panel 2 on the side of the body 1, thereby mounting the head protecting airbag device M on the vehicle V.

When the inflator 12 is operated by an operation signal transmitted from the control device after the head protecting airbag device M is mounted on the vehicle V, an inflation gas discharged from the inflator 12 flows into the airbag 20 and the inflated airbag 20 protrudes from the protruding openings 40 of the casings 38F and 38R to be developed while protruding downward and pressing an airbag cover 10. Accordingly, the airbag is completely expanded to cover windows W1 and W2 or center and rear pillar parts CP and RP as depicted by the two-dotted chain line illustrated in FIG. 1.

Figure 3:
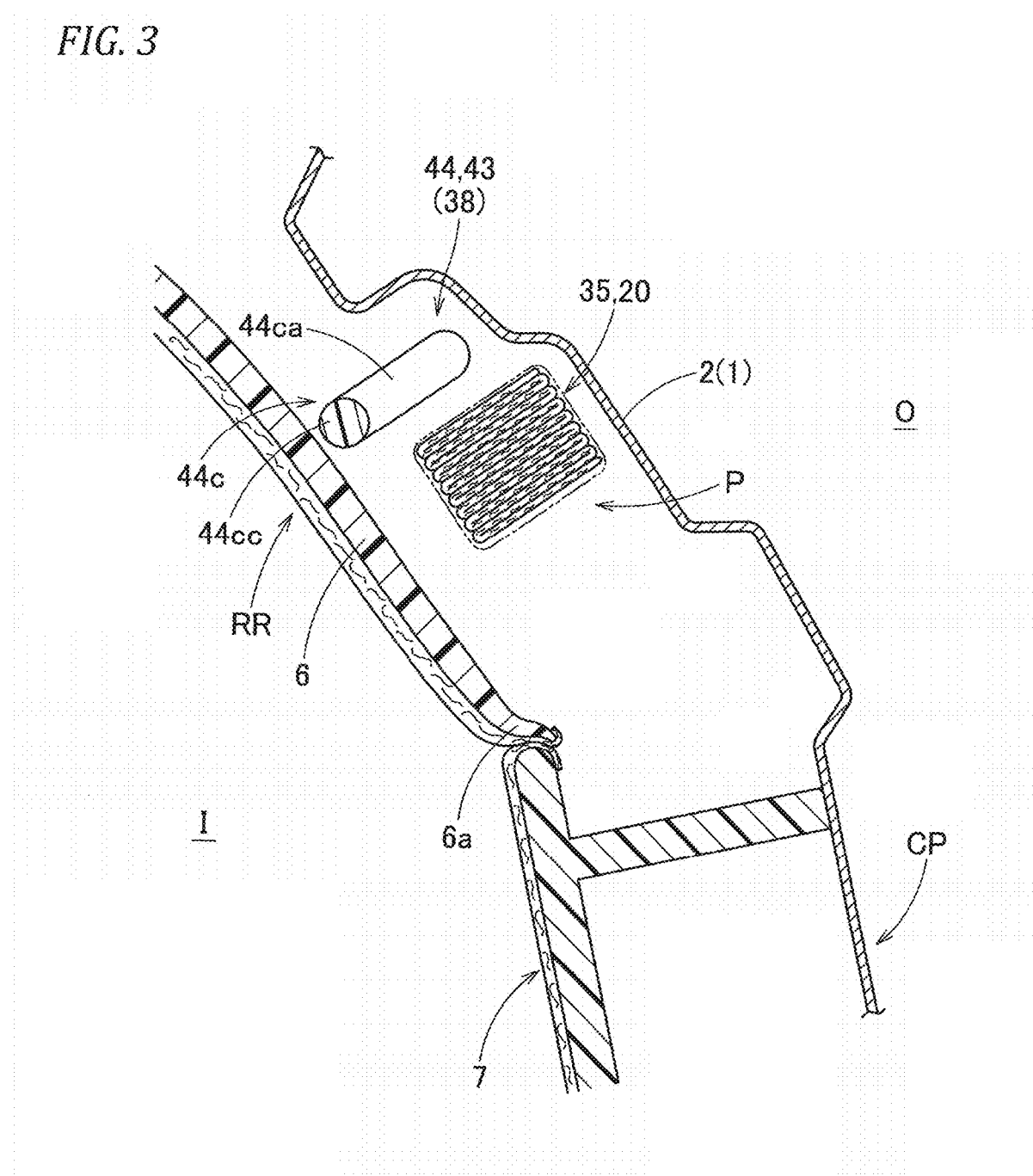
FIG. 3 is a vertical cross-sectional view taken along line III-III in FIG. 1 and illustrates the head-protecting airbag device according to the embodiment in a state of being mounted in a vehicle.

Then, in the head protecting airbag device M of the embodiment, the curved portion 44 of the coupling piece 43 for connecting the casings 38F and 38R is disposed so that a direction protruding from the reference line L connecting the base portion 43a and the front end 43b of the coupling piece 43 in a state where the folded body 35 is folded so that the protruding openings 40 of the casings 38F and 38R face each other intersects a surface (casing overlapping reference surface) F following the length direction DL1 of the casings 38F and 38R and the overlapping direction DL2 of the protruding opening 40. That is, in the head protecting airbag device M of the embodiment, the curved portion 44 is disposed to pass through a position separated from the outermost peripheral side in the folded area (folded area 35a) of the folded body 35 as illustrated in FIGS. 16 and 17 when the folded body 35 is folded so that the protruding openings 40 of the casings 38F and 38R are brought close to each other. Therefore, in the head protecting airbag device M of the embodiment, the curved portion 44 does not protrude directly above the casings 38F and 38R while the casings 38F and 38R accommodating the folded body 35 are mounted on the vehicle V differently from a case where the curved portion is disposed so that the direction protruding from the reference line follows the surface along the length direction of the casing and the overlapping direction of the protruding opening (a case where the curved portion passes through the outermost peripheral side of the folded area) as in the related art. As a result, the upward protruding amount is suppressed. Therefore, as illustrated in FIG. 3, even when the inner panel 2, which is a member on the vehicle body side, is disposed near the upper side of the accommodation portion P and a wide accommodation space in the vertical direction is not easily ensured, the folded body 35 accommodated in the casings 38F and 38R can be smoothly accommodated at the accommodation position P near the upper edges of the windows W1 and W2.

Thus, even when the head protecting airbag device M of the embodiment includes the coupling piece 43 connecting the casings 38F and 38R to each other, the head protecting airbag device can be smoothly mounted on the vehicle V without interference from the peripheral vehicle body side members.

Specifically, in the head protecting airbag device M of the embodiment, the bending portion 44 is formed so that the direction protruding from the reference line connecting the base portion 43a and the front portion 43b of the coupling piece 43 while the head protecting airbag is mounted on the vehicle is defined as a direction protruding toward the vehicle interior side I above the folded body 35. Therefore, since the curved portion 44 can be disposed in the area on the inner side of the casings 38F and 38R having a comparatively large margin in the storage space, it is possible to further reliably suppress the interference between the peripheral vehicle body side members and the folded body 35 accommodated in the casings 38F and 38R. Of course, if it is possible to ensure the accommodation space at the time of mounting on the vehicle and to suppress interference with the folded body without considering such a configuration, the curved portion may be formed to protrude toward the vehicle exterior side or may be formed to protrude obliquely upward or downward at the vehicle interior side or the vehicle exterior side.

Further, in the head protecting airbag device M of the embodiment, the curved portion 44 is formed in a columnar shape having a substantially circular cross-section. For this reason, since the cross-section modulus of the curved portion 44 becomes the same even when the curved portion is curved in any direction, uniform bending easiness can be ensured. Therefore, even when the overlapping direction of the casings 38F and 38R when folding the folded body 35 is different from that of the embodiment, for example, when the folded body is folded so that the vehicle interior side walls 39b of the casings 38F and 38R overlap each other or the vehicle exterior side walls 39c overlap each other, the curved portion 44 can be easily bent and thus the folded body 35 can be smoothly folded. Particularly, in the embodiment, the curved portion 44 is formed in a columnar shape having a substantially circular cross-section, and thus the curved portion can be bent smoothly in all directions. In addition, since a molding die for forming the casing 38F can be formed by two split molds without a core if the curved portion 44 has a columnar shape, it is possible to manufacture the casing at a low cost due to a simple mold configuration. If such a point is not considered, the shape of the curved portion is not limited to this. For example, the cross-sectional shape may be a columnar shape in which the separation distance from the axis center to the outer surface is substantially equal. In other words, the cross-sectional shape may be substantially circular. Specifically, the curved portion may be formed to have a cross-sectional shape such as a chamfered quadrangular shape, a chamfered triangular shape, or a polygonal shape such as a pentagonal shape and a hexagonal shape. Even when the curved portion has such a configuration, since the cross-section modulus of the curved portion becomes the same even when the curved portion is curved in any direction, uniform bending easiness can be ensured. Further, the curved portion may have a stripe shape if the bending easiness of the curved portion is not considered.

Figure 15:
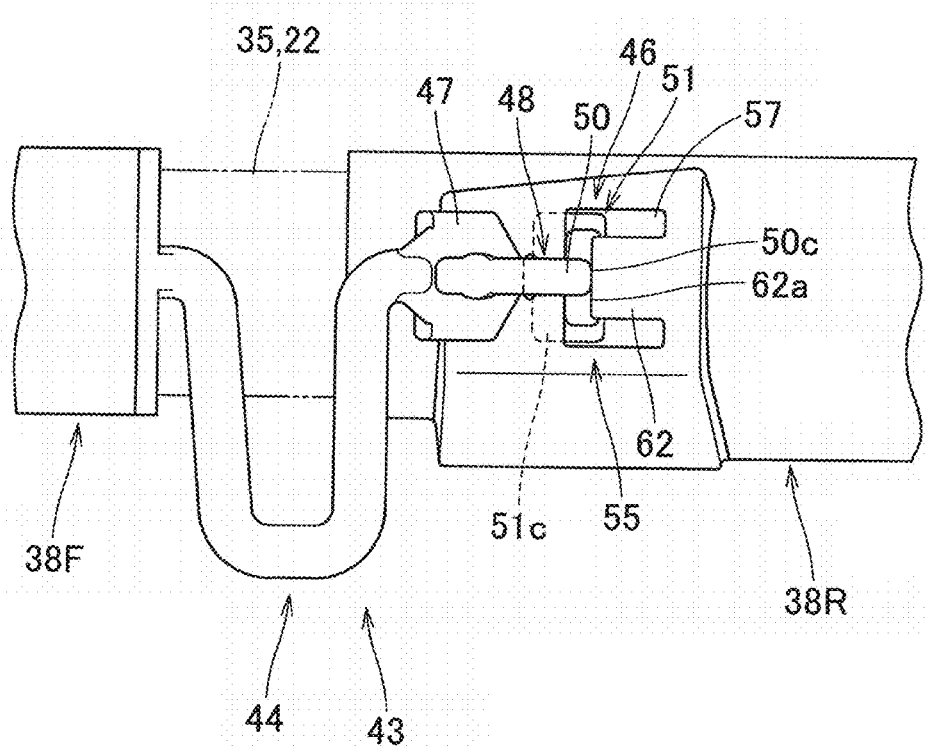
FIG. 15 is a partially enlarged plan view illustrating a state a rear surface of a tip portion of a neck portion in a male engaging portion abuts on a front end of a pressing piece of a female engaging portion in the head-protecting airbag device according to the embodiment.

Further, in the head protecting airbag device of the embodiment, since the coupling piece 43 connecting the casings 38F and 38R includes the foldable curved portion 44, the curved portion 44 is also twisted along with the folded body 35 when the folded body 35 (the airbag 20) is twisted between the casings 38F and 38R. Accordingly, the twisting of the folded body 35 can be easily detected. Further, in the head protecting airbag device M of the embodiment, the female engaging portion 55 includes the pressing piece 62 which suppresses the head 51 from being separated from the locking hole 57 and the pressing piece 62 is disposed to block the substantially whole area of the wide-width opening 60. For this reason, even when the front end 50 of the neck portion 48 of the male engaging portion 46 moves toward the wide-width opening 60 when the folded body 35 is twisted, the front end 50 comes into contact with the front end 62a of the pressing piece 62 as illustrated in FIG. 15. Further, at this time, the head 51 overlaps the peripheral edge 59 of the narrow-width opening 58 at the front end side portion thereof and the locking state between the narrow-width opening 58 and the peripheral edge 59 is maintained. Therefore, it is possible to reliably prevent the head 51 from being separated from the wide-width opening 60. For that reason, it is possible to maintain the coupling between the casings 38F and 38R through the coupling piece 43 even when the curved portion 44 is twisted when the folded body 35 is twisted.

Further, in the embodiment, an example has been described in which the folded body 35 (the airbag assembly AM) is folded so that the protruding openings 40 and 40 face each other during transportation. However, the folded shape of the folded body is not limited to the embodiment. For example, the folded body can be also transported while being folded so that the vehicle interior or exterior side walls of the casing face each other or the ceiling walls face each other. In the embodiment, since the curved portion 44 connecting the casings 38F and 38R has a columnar shape having a substantially circular cross-section and can be smoothly bent in all directions, the curved portion can be easily folded regardless of the arrangement of the casings at the time of folding the curved portion and thus the workability is good.

What is claimed is:

1. A head-protecting airbag device comprising:
an airbag configured to cover a window of a vehicle when the airbag is deployed and inflated, the airbag being stored in an upper edge of the window on a vehicle interior side; and
a plurality of casings, each of which is made by synthetic-resin, and stores a folding completion body of the airbag formed by folding a lower edge to be brought close to an upper edge when the airbag is deployed and inflated, wherein:
each of the casings has a protruding opening for protruding the airbag at least in a lower portion thereof when the casings are mounted in the vehicle;
the casings are arranged in a longitudinal direction of the folding completion body, and are connected to each other by bendable coupling pieces;
the folding completion body is configured to be carried in a state of being stored in one casing of the casings by bending of the coupling pieces, before being mounted in the vehicle;
the coupling piece has a curved portion that is disposed in a curved manner by reversing between a base portion of one casing side and a tip portion of another casing side; and
the curved portion is formed such that a protruding direction from a reference line connecting the base portion and the tip portion of the coupling piece is set in a direction intersecting with a surface along an overlapping direction of a longitudinal direction of the one casing with protruding openings, in the state where the folding completion body is bent to cause the protruding openings of two casings connected to each other by the coupling pieces to face each other.

2. The head-protecting airbag device according to claim 1, wherein the curved portion is formed such that the protruding direction from the reference line connecting the base portion and the tip portion of the coupling piece, in a state of being mounted in the vehicle, is a direction protruding towards a vehicle interior side in an upper side of the folding completion body.

3. The head-protecting airbag device according to claim 1, wherein the curved portion is formed in a shape of a column having an almost equal isolation distance from an axial center to an outer surface thereof.

4. The head-protecting airbag device according to claim 3, wherein the curved portion is formed to have substantially a circular cross-section.

\* \* \* \* \*